(12) United States Patent
Vartiainen et al.

(10) Patent No.: US 8,664,821 B2
(45) Date of Patent: Mar. 4, 2014

(54) ARRANGEMENT FOR ATTACHING A MAGNET TO A ROTOR, AND A ROTOR

(75) Inventors: Ari Vartiainen, Vantaa (FI); Petri Mäki-Ontto, Espoo (FI); Pekka Kanninen, Espoo (FI)

(73) Assignee: ABB Technology AG, Zurich (CH)

( * ) Notice: Subject to any disclaimer, the term of this patent is extended or adjusted under 35 U.S.C. 154(b) by 99 days.

(21) Appl. No.: 13/305,226

(22) Filed: Nov. 28, 2011

(65) Prior Publication Data

US 2012/0133233 A1    May 31, 2012

Related U.S. Application Data

(63) Continuation of application No. PCT/FI2010/050356, filed on Apr. 30, 2010.

(30) Foreign Application Priority Data

May 27, 2009    (FI) ...................................... 20095581

(51) Int. Cl.
 *H02K 21/12*    (2006.01)
(52) U.S. Cl.
 USPC ............ 310/156.48; 310/156.18; 310/156.19; 310/156.73
(58) Field of Classification Search
 USPC ............. 310/156.18, 165.19, 156.48, 156.68, 310/156.72, 156.73, 261.1
 See application file for complete search history.

(56) References Cited

U.S. PATENT DOCUMENTS

| | | | |
|---|---|---|---|
| 4,327,302 A | | 4/1982 | Hershberger |
| 2007/0145848 A1 | | 6/2007 | Nakahara et al. |
| 2008/0088194 A1 | * | 4/2008 | Jarvinen et al. .......... 310/156.23 |

FOREIGN PATENT DOCUMENTS

| | | | |
|---|---|---|---|
| CN | 201234194 Y | | 5/2009 |
| DE | 2532049 A1 | | 2/1976 |
| EP | 0143693 A2 | | 6/1985 |
| GB | 2063576 A | | 6/1981 |
| JP | 4-26339 A | | 1/1992 |
| JP | 06086486 A | * | 3/1994 |
| JP | 10-336929 A | | 12/1998 |
| JP | 2000-156946 A | | 6/2000 |
| JP | 2002-64951 A | | 2/2002 |
| JP | 2003-510998 A | | 3/2003 |
| JP | 2007-181304 A | | 7/2007 |
| WO | WO 01/22560 A1 | | 3/2001 |

OTHER PUBLICATIONS

Machine Translation JP06086486 (1994).*

(Continued)

*Primary Examiner* — Tran Nguyen
*Assistant Examiner* — Jose Gonzalez Quinones
(74) *Attorney, Agent, or Firm* — Buchanan Ingersoll & Rooney PC

(57) ABSTRACT

An arrangement for attaching a permanent magnet to the rotor of an electrical machine and such a rotor are provided. The rotor is assembled of sheets and includes at least two magnetic poles and a magnetic core. Permanent magnets are installable on a surface of the magnetic core, and a pole piece assembled of sheets is installable on a side of the permanent magnet that faces an air gap. At least one channel passing through the pole piece is built in the pole piece and magnetic core. A tightening strip is installable in the channel. The tightening strip is attachable to the pole piece using locking parts, and an end of the tightening strip facing the magnetic core includes fixing parts for attaching the tightening strip to the magnetic core.

26 Claims, 2 Drawing Sheets

(56) References Cited

OTHER PUBLICATIONS

International Search Report (PCT/ISA/210) issued on Oct. 13, 2010, by European Patent Office as the International Searching Authority for International Application No. PCT/FI2010/050356.

Finnish Search Report issued on Nov. 18, 2009 for Finnish Patent Application No. 20095581.

Allowance Decision issued on Mar. 26, 2013 for South Korean Patent Application No. 9-5-2013-020119058.

* cited by examiner

ARRANGEMENT FOR ATTACHING A MAGNET TO A ROTOR, AND A ROTOR

RELATED APPLICATION

This application claims priority as a continuation application under 35 U.S.C. §120 to PCT/FI2010/050356, which was filed as an International Application on Apr. 30, 2010, designating the U.S., and which claims priority to Finish Application 20095581, filed in Finland on May 27, 2009. The entire contents of these applications are hereby incorporated by reference in their entireties.

FIELD

The present disclosure is related to an arrangement for attaching a permanent magnet to a rotor, and to a rotor.

BACKGROUND INFORMATION

In a permanent-magnet synchronous machine, a magnetic field is generated using permanent magnets installed in the machine's rotor. The permanent magnets are either fitted on the surface of the rotor facing the air gap, or the permanent magnets are embedded into the rotor's magnetic core. The magnetic core is most often made of ferromagnetic iron sheets assembled into a sheet core extending throughout the rotor's length. The design criterion for dimensioning the permanent magnets and sheet core is the excitation power required by the electrical machine. The mechanical structure and the fastening of different components are affected by factors such as the forces imposed on them and the size of the electrical machine.

A permanent magnet is a component manufactured from a magnetically hard material and is able to retain its magnetism permanently after magnetization. Permanent magnets are manufactured, for example, from an AlNiCo mixture that includes aluminum, nickel, cobalt and steel, or from ceramic materials or rare earth metals.

As permanent magnets are embedded into the magnetic core of a rotor assembled from uniform sheets in a characteristic manner, thin necks will be generated on both sides of the permanent magnet, supporting the pole piece. As the rotor rotates at a non-standard speed or varying speed, the thin necks bear the load caused by centrifugal forces generated by the pole and magnets, and an alternating load is directed at the thin necks. The alternating load causes fatigue, and the allowed fatigue stresses are significantly lower than the allowed static stresses. In addition, some of the flux generated by the magnets is lost because of the stray flux short-circuited by the thin necks.

Centrifugal forces also tend to cause transitions in the pole. In order to prevent any transitions, the necks must be able to maintain tight compression.

A characteristic method of attaching permanent magnets to the rotor surface facing the air gap is to glue the permanent magnets to the rotor surface and install a supporting binding made of carbon fiber around the rotor. Disadvantages of this solution include a decrease in the mechanical air gap between the stator and rotor, which may cause problems in installation or damage the binding during installation or when the rotor rotates, or an increase in the magnetic circuit's air gap if the mechanical air gap is not to be reduced. This will increase wear in the magnetic material.

SUMMARY

An exemplary embodiment of the present disclosure provides an arrangement for attaching a permanent magnet to a rotor. The rotor is assembled of sheets and includes at least two magnetic poles and a magnetic core. The exemplary arrangement includes permanent magnets installed on a surface of the magnetic core of the rotor, and a pole piece which is assembled of sheets and which is installed on a side of the permanent magnet that faces an air gap. The exemplary arrangement also includes at least one channel built in the pole piece and magnetic core and passing through the pole piece, and a tightening strip installable in the channel. The tightening strip is attached to the pole piece by means of locking parts. An end of the tightening strip facing the magnetic core includes fixing parts for attaching the tightening strip to the magnetic core.

An exemplary embodiment of the present disclosure provides a rotor of an electrical machine. The exemplary rotor includes an assembly of sheets, at least two magnetic poles, a magnetic core, permanent magnets installed on a surface of the magnetic core, and a pole piece which is assembled of sheets and which is installed on a side of the permanent magnet that faces an air gap. The pole piece and magnetic core include at least one channel passing through the pole piece. A tightening strip is installed in the channel. The tightening strip is attached to the pole piece by means of locking parts. An end of the tightening strip facing the magnetic core is attached to the magnetic core by means of fixing parts.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
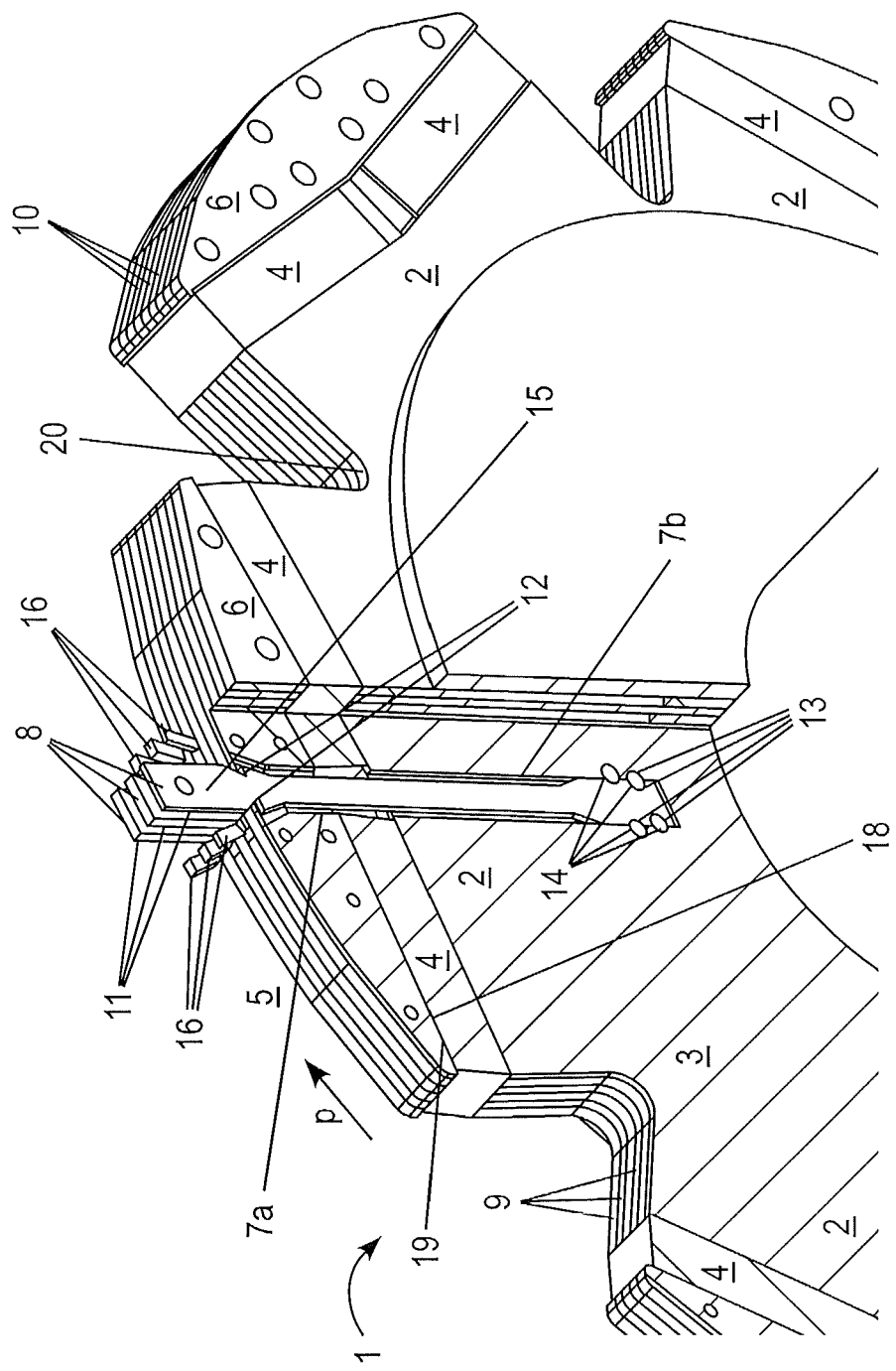
FIG. 1 is a partial illustration of a rotor of an electrical after pretensioning the permanent magnets, according to an exemplary embodiment of the present disclosure.

Exemplary embodiments of the present disclosure provide an arrangement for attaching a magnet to a rotor, and a rotor in which the stray flux is as little as possible, wear is reduced in the magnetic material, and the capacity of bearing the load caused by the centrifugal forces of the pole and magnets is at a good level without increasing the air gap between the stator and rotor.

An exemplary embodiment of the present disclosure provides an arrangement for attaching a permanent magnet to a rotor of an electrical machine. The rotor is assembled of sheets and includes at least two magnetic poles. Permanent magnets are installed on the surface of the magnetic core of the rotor. A pole piece assembled of sheets is installed on the permanent magnet side facing an air gap. At least one channel passing through the pole piece is built in the pole piece and magnetic core. A tightening strip is installable in the channel. The tightening strip is attached to the pole piece using locking parts. An end of the tightening strip facing the magnetic core includes fixing parts for attaching the tightening strip to the magnetic core.

In an electrical machine rotor in accordance with an exemplary embodiment of the present disclosure, the rotor is assembled of sheets. The rotor includes at least two magnetic poles. Permanent magnets are installed on the surface of the magnetic core of the rotor. A pole piece assembled of sheets is installed on the permanent magnet side facing an air gap.

The pole piece and magnetic core include at least one channel passing through the pole piece. A tightening strip is installed in the channel. The tightening strip is attached to the pole piece using locking parts. An end of the tightening strip facing the magnetic core is attached to the magnetic core using fixing parts.

For attaching the permanent magnet, an exemplary embodiment of the present disclosure provides for the use of a detachable pole piece which is attached to the rotor using separate tightening strips, and locking and fixing parts. In accordance with this configuration, the load caused by centrifugal forces is divided evenly between the pole piece and tightening strips. Because the centrifugal load caused by the pole and permanent magnets is born by separate parts, their material and shape can be kept separate from the electrical dimensioning of the electrical machine. This exemplary configuration produces a good capacity for bearing the load caused by the centrifugal forces generated by the pole and permanent magnets.

In accordance with an exemplary embodiment of the present disclosure, the parts that bear the centrifugal force are pre-tensioned when attaching the permanent magnet. A changing centrifugal force does not cause an alternating stress load on the pre-tensioned tightening strip. Through pretensioning, the transitions caused by centrifugal forces in the pole can be minimized. The tight compression of the pole piece against the permanent magnet produced using tightening strips evens out as the rotor rotates as centrifugal forces tend to push the permanent magnet towards the air gap in a radial direction. The frictional force caused by pre-tensioning between the magnetic pole and permanent magnets transfers the electrical machine's torque.

Using tightening strips with rectangular cross-sections, it is possible to produce a large amount of pre-tensioning force in a narrow space. The tightening strip acts as a stretching spring. This exemplary configuration in accordance with the present disclosure enables different lengths for the tightening strip, resulting in controlled flexibility.

By shaping the side of the pole piece that faces the magnet so that it is free in its middle and in contact on its sides, the pole piece can be utilized in pre-tensioning. During pre-tensioning, the pole piece bends, losing the gap between the pole piece and magnets, in which case bending stress is generated in the pole piece, improving the structure's fatigue resistance. By shaping the pole piece, surface pressure on the magnet surface can also be evened out, which improves the durability of the magnet under pressure.

The pole piece support assembled on tightening strips is more efficient than a round bolt, considering the use of space. A narrower bundle of tightening strips can achieve the same cross-sectional area as a similar-size bolt. A narrower pole support enables a wider magnet in relation.

The space required by the tightening strip in the rotor's axial direction is smaller than that required by a screw attachment because the tightening strip base is in the radial direction. In a screw attachment, the screw head requires space in the axial direction, limiting the number of screws in the axial direction.

A tightening strip can be attached to the laminated structure because of its thin, sheet like shape without needing to make any threads in the rotor core that are required by a screw attachment. Because of its sheet-like shape, the tightening strip includes part of the structure assembled of electric sheets. The use of tightening strips in attaching the pole piece enables a more even load distribution between the pole piece and magnetic core because tightening strips can be added evenly to the structure in the rotor's axial direction. A tightening strip can be attached to the rotor core through form closure or using fixing parts that distribute the force directed at the tightening strip more evenly in the rotor's axial direction. When using a tightening strip, the load can be divided evenly between uniform sheets in the rotor core and pole piece.

In accordance with an exemplary embodiment of the present disclosure, the air gap between the rotor and stator is not reduced because the fixing and locking parts are not extended outside the outer pole piece surface facing the air gap.

According to an exemplary embodiment of the present disclosure, the channel can be formed between two permanent magnets in the circumferential direction. A single pole may, for example, contain three permanent magnets side-by-side in the circumferential direction, and channels for tightening strips can be generated in two gaps between the permanent magnets.

According to an exemplary embodiment of the present disclosure, the tightening strip is made of a non-magnetic material. In this case, the stray flux is significantly smaller because the pole piece and rotor back are not in contact through a magnetic material.

According to an exemplary embodiment of the present disclosure, several channels may be generated in the pole piece and magnetic core so that the channels are in succession in the rotor's longitudinal direction. In this case, the space required by the channels is as small as possible in the cross-section of the pole, and there is more cross-section for the permanent magnet.

According to an exemplary embodiment of the present disclosure, the channel generated in the pole piece and magnetic core is substantially radial. In this case, the tightening strip is set in the radial direction and no bending forces are generated.

According to an exemplary embodiment of the present disclosure, the channel has been formed in the middle of the pole piece in the circumferential direction. In this case, the pole piece can be built in an advantageous shape where the pole piece is thickest in the middle of the pole piece, and the thickness reduces towards the sides of the pole piece. This way, less material is required for the pole piece, and its weight is smaller compared with a pole piece supported on the sides.

The pole piece and rotor have been assembled of sheets by laminating. According to an exemplary embodiment of the present disclosure, at least two thin sheets of different shapes can be used in the pole piece and rotor. The sheets of different shapes can be connected so that one or more channels are created in the pole piece and magnetic core.

In accordance with an exemplary embodiment of the arrangement and rotor of the present disclosure, the pole piece's radial compressive force aimed at the permanent magnet can be set by pulling the tightening strip(s). The base of the tightening strip is attached to the magnetic core using, for example, a form closure. The tightening strip(s) and pole piece are pre-tensioned by pulling the tightening strip(s) upwards in a radial direction, while pressing the pole piece downwards in a radial direction. While tensioning, the tightening strip(s) is locked to the pole piece using locking parts. After pre-tensioning, the tightening strip is cut to a suitable length. The tightening strip can also be cut to its final length during pretensioning.

In accordance with an exemplary embodiment, tightening strips are attached to the magnetic core and pole piece by locking the tightening strip after tensioning. In this case, manufacturing tolerances or thermal movements do not have an influence on the pre-tensioning force.

In accordance with an exemplary embodiment of the arrangement and rotor of the present disclosure, the pole gaps are free from the parts required for attaching the permanent magnet. This enables a rotor structure with an unbalanced pole division, for example, successive pole gaps are of different sizes.

The arrangement and rotor in accordance with the present disclosure are suitable for electrical machines cooled in different ways. Axial and/or radial cooling channels can be built so that the pole pieces and tightening strips, including their locking and fixing parts, are not in front of the cooling channels.

The arrangement and rotor in accordance with the present disclosure allow a large speed range in the air gap, and exemplary embodiments of the arrangement and rotor also enable large air gap speeds of more than 70 m/s, for example.

The drawings illustrate an exemplary embodiment of a rotor for an electrical machine rotor. The illustrated rotor is for a permanent-magnet motor or a permanent-magnet generator, for example. The magnetic cores and pole pieces of rotors illustrated in the drawings are assembled of thin armature sheets.

Figure 2:
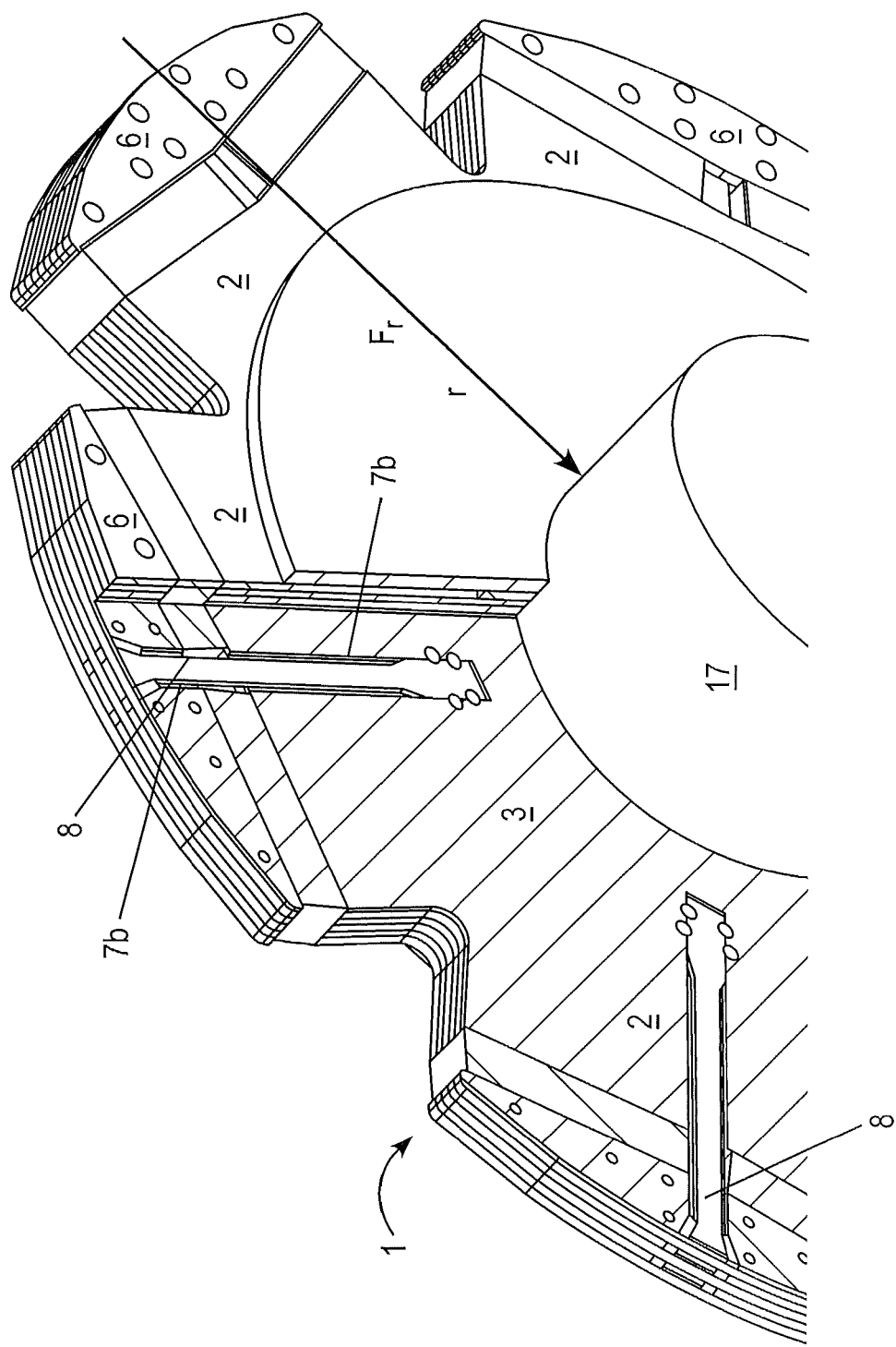
FIG. 2 is a partial illustration of the rotor presented in FIG. 1 after attaching the permanent magnets, according to an exemplary embodiment of the present disclosure.

FIG. 1 is a partial illustration of a rotor 1 of an electrical machine after pre-tensioning the permanent magnets, according to an exemplary embodiment of the present disclosure. FIG. 2 is a partial illustration of the rotor 1 presented in FIG. 1 after attaching the permanent magnets, according to an exemplary embodiment of the present disclosure.

FIG. 1 illustrates an exemplary embodiment in which the rotor 1 is manufactured of sheets 9, rotates around its axis 17 (see FIG. 2) and contains several magnetic poles 2. Permanent magnets 4 are installed by magnetic poles 2 on the surface of the magnetic core 3. A pole piece 6 formed of sheets is installed in the magnetic pole 2, on the side of the permanent magnets 4 that faces the air gap 5.

Several channels 7a are built in the pole piece 6 for tightening strips 8. The channels 7a pass through the pole piece 6 in a radial direction. The number of channels 7b corresponding with the number of channels 7a in the pole pieces 6 are generated in the magnetic core 3. The pole piece channels 7a successive in the radial direction and the magnetic core channels 7b form fixing channels for tightening strips 8. The channels 7a-b are built using the sheet structure of the magnetic core 3 and pole piece 6 by stacking sheets 9, 10 of different shapes one on top of each other so that channels 7a-b are formed between the sheets 9, 10. The channels 7a in the pole pieces 6 and the channels 7b in the magnetic core 3 are located so that they sit between two permanent magnets 4 in the circumferential direction p, in which case the free space between the permanent magnets 4 acts as part of the fixing channel. The channels 7a in the pole pieces 6 and the channels 7b in the magnetic core 3 are substantially in the middle of the pole piece 6 in the circumferential direction p. The fixing channels 7a-b are in succession in the longitudinal direction of the rotor 1, so that the space required by the fixing channels 7a-b is small between the permanent magnets 4 in the circumferential direction p. The channels 7a in the pole pieces 6 and the channels 7b in the magnetic core 3 are substantially in a radial direction r.

Tightening strips 8 manufactured of a non-magnetic material, such as stainless steel, are installed in the fixing channels 7a-b. The tightening strip 8 is elongated with a rectangular cross-section.

In FIG. 1, chamfers 12 are generated on both short sides 11 of the tightening strips 8, for example, to the top part of the tightening strip 8 facing the air gap 5. In the drawings, the width of the tightening strip's center part is substantially standard in the circumferential direction.

The tightening strip 8 is attached to the magnetic core 3 from the base of the tightening strip 8 that faces the magnetic core 3 using fixing parts. In FIGS. 1 and 2, the fixing parts include the form-closed shapes of the tightening strip 8 and magnetic core 3. Semi-circular notches 13 have been generated at the base of the tightening strip 8, with which the tightening strip form-closes through the rotor 1 to the rods 14 installed after the installation of the tightening strip 8.

The part of the tightening strip 8 extending to the air gap 5 includes the tension part 15. The tightening strips 8 and pole piece 6 are pre-tensioned by pulling the tightening strips 8 from their tension parts 15 towards the air gap 5 in a radial direction r, while pressing the pole piece 6 towards the magnetic core 3 in a radial direction r. The compressive force $F_r$ of the pole piece 6 towards the permanent magnet 4 in the radial direction r is adjusted by pulling the tightening strip 8. The tightening strips 8 are locked to the pole piece 6 during the pull using fixing parts, such as wedges 16. After pre-tensioning, the tightening strip 8 is cut to a suitable length by cutting off the tension part 15. The tightening strip 8 can also be cut to its final length during pre-tensioning. In this case, the tightening strips 8 are pulled from their tension parts 15 until the tightening strip 8 breaks from the chamfers 12, as illustrated in FIG. 2.

In the attachment arrangement for the permanent magnet 4, fatigue resistance can be increased by generating bending stress in the pole piece 7. In this case, the lower surface 19 of the pole piece 7 against the top surface of the permanent magnet 4 is shaped so that there is a gap between the lower surface 19 and the top surface 18 of the permanent magnet 4 before attaching the pole piece 7 using the tightening strips 8. The axial gap is in the center of the lower surface 19 of the pole piece 7 in the circumferential direction so that the parts of the lower surface 19 of the pole piece 7 facing the pole gaps 20 are connected to the top surface 18 of the permanent magnet.

When the pole piece 7 is attached to the magnetic core 3 using the tightening strips 8, a radial r compressive force $F_r$ is directed at the permanent magnet 4. Its magnitude can be adjusted using the tightening strip 8. During pretensioning, the pole piece 7 bends, reducing and closing the gap between the permanent magnets 4 and the pole piece 7. In this case, bending stress is generated in the pole piece 7, improving the fatigue resistance of the structure.

If the magnetic pole 2 is wide (e.g., contains several parallel permanent magnets 4 in the circumferential direction), the permanent magnets 4 can be attached so that fixing channels 7a-b are generated between each two permanent magnets 4 where the tightening strips 8 are installed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOLS ILLUSTRATED IN THE DRAWINGS 1 rotor
2 magnetic pole
3 magnetic core 4 permanent magnet
5 air gap
6 pole piece
7a, b channel
8 tightening strip
9 rotor sheet
10 pole piece sheet
11 side
12 chamfer
13 notch
14 rod
15 tension part
16 wedge
17 shaft
18 top surface
19 lower surface
20 pole gap
$F_r$ compressive force
p circumferential direction
r radial direction

What is claimed is:

1. An arrangement for attaching a permanent magnet to a rotor, wherein the rotor is assembled of sheets and the rotor includes at least two magnetic poles and a magnetic core, wherein the arrangement comprises:
   permanent magnets installed on a surface of the magnetic core of the rotor;
   a pole piece which is assembled of sheets and which is installed on a side of the permanent magnet that faces an air gap;
   at least one channel built in the pole piece and magnetic core and passing through the pole piece; and
   a tightening strip installable in the channel, wherein:
   the tightening strip is attached to the pole piece by means of locking parts; and
   an end of the tightening strip facing the magnetic core comprises fixing parts for attaching the tightening strip to the magnetic core.

2. An arrangement according to claim 1, wherein the channel is generated between two permanent magnets in a circumferential direction.

3. An arrangement according to claim 1, wherein the tightening strip is made of a non-magnetic material.

4. An arrangement according to claim 1, comprising:
   several channels built in the pole piece and magnetic core, the channels being in succession in a longitudinal direction of the rotor.

5. An arrangement according to claim 1, wherein the channel is substantially in a radial direction.

6. An arrangement according to claim 1, wherein the channel is formed substantially in a middle of the pole piece in a circumferential direction.

7. An arrangement according to claim 1, wherein the rotor sheets are of different shapes, and the rotor sheets are joined together so that a channel is formed in the magnetic core.

8. An arrangement according to claim 1, wherein the sheets of the pole piece are of different shapes, and the sheets of the pole piece are joined together so that a channel is formed in the pole piece.

9. An arrangement according to claim 1, wherein a compressive force of the pole piece towards the permanent magnet in a radial direction is adjustable by pulling the tightening strip.

10. An arrangement according to claim 1, wherein the fixing parts are formed by a form-closed shape of the tightening strip and magnetic core.

11. An arrangement according to claim 1, comprising:
    a gap between the top surface of the permanent magnet and a lower surface of the pole piece that is against the permanent magnet,
    wherein the gap is in a middle of the pole piece in a circumferential direction, and the gap is reducable by pulling the tightening strip.

12. An arrangement according to claim 11, wherein the lower surface of the pole piece against the permanent magnet is concave in the circumferential direction.

13. A rotor of an electrical machine, the rotor comprising:
    an assembly of sheets;
    at least two magnetic poles;
    a magnetic core;
    permanent magnets installed on a surface of the magnetic core; and
    a pole piece which is assembled of sheets and which is installed on a side of the permanent magnet that faces an air gap, wherein:
    the pole piece and magnetic core include at least one channel passing through the pole piece;
    a tightening strip is installed in the channel;
    the tightening strip is attached to the pole piece by means of locking parts; and
    an end of the tightening strip facing the magnetic core is attached to the magnetic core by means of fixing parts.

14. An arrangement according to claim 2, wherein the channel is formed substantially in a middle of the pole piece in the circumferential direction.

15. An arrangement according to claim 14, comprising:
    a gap between the top surface of the permanent magnet and a lower surface of the pole piece that is against the permanent magnet,
    wherein the gap is in a middle of the pole piece in the circumferential direction, and the gap is reducable by pulling the tightening strip.

16. An arrangement according to claim 15, wherein the lower surface of the pole piece against the permanent magnet is concave in the circumferential direction.

17. An arrangement according to claim 2, wherein the tightening strip is made of a non-magnetic material.

18. An arrangement according to claim 17, comprising:
    several channels built in the pole piece and magnetic core, the channels being in succession in a longitudinal direction of the rotor.

19. An arrangement according to claim 17, wherein the channel is substantially in a radial direction.

20. An arrangement according to claim 19, wherein the channel is formed substantially in a middle of the pole piece in a circumferential direction.

21. An arrangement according to claim 20, wherein the rotor sheets are of different shapes, and the rotor sheets are joined together so that a channel is formed in the magnetic core.

22. An arrangement according to claim 21, wherein the sheets of the pole piece are of different shapes, and the sheets of the pole piece are joined together so that a channel is formed in the pole piece.

23. An arrangement according to claim 22, wherein a compressive force of the pole piece towards the permanent magnet in a radial direction is adjustable by pulling the tightening strip.

24. An arrangement according to claim 23, wherein the fixing parts are formed by a form-closed shape of the tightening strip and magnetic core.

25. An arrangement according to claim 24, comprising:
a gap between the top surface of the permanent magnet and a lower surface of the pole piece that is against the permanent magnet,
wherein the gap is in a middle of the pole piece in a circumferential direction, and the gap is reducable by pulling the tightening strip.

26. An arrangement according to claim 25, wherein the lower surface of the pole piece against the permanent magnet is concave in the circumferential direction.

* * * * *